(12) United States Patent
Legnedahl

(10) Patent No.: US 11,081,742 B2
(45) Date of Patent: Aug. 3, 2021

(54) METHOD AND SYSTEM FOR THERMAL CONDITIONING OF A BATTERY PACK

(71) Applicant: VOLVO TRUCK CORPORATION, Gothenburg (SE)

(72) Inventor: Niklas Legnedahl, Onsala (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 275 days.

(21) Appl. No.: 16/305,447

(22) PCT Filed: May 31, 2016

(86) PCT No.: PCT/EP2016/062283
§ 371 (c)(1),
(2) Date: Nov. 29, 2018

(87) PCT Pub. No.: WO2017/207034
PCT Pub. Date: Dec. 7, 2017

(65) Prior Publication Data
US 2020/0324660 A1    Oct. 15, 2020

(51) Int. Cl.
*H01M 10/00* (2006.01)
*H01M 10/625* (2014.01)
(Continued)

(52) U.S. Cl.
CPC ........... *H01M 10/625* (2015.04); *B60L 53/14* (2019.02); *B60L 53/302* (2019.02); *B60L 58/26* (2019.02);
(Continued)

(58) Field of Classification Search
CPC ............. H01M 10/625; H01M 10/613; H01M 10/615; H01M 10/633; H01M 2220/20;
(Continued)

(56) References Cited

U.S. PATENT DOCUMENTS

2009/0021221 A1    1/2009  Krauer et al.
2011/0031937 A1*   2/2011  Bito ................. B60L 58/12
                                              320/150
(Continued)

FOREIGN PATENT DOCUMENTS

WO    2015024993 A1    8/2015

*Primary Examiner* — Nicholas P D'Aniello
(74) *Attorney, Agent, or Firm* — Venable LLP; Jeffri A. Kaminski

(57) ABSTRACT

The invention relates to a method for thermal conditioning of a battery pack (4), wherein said battery pack (1) comprises a plurality of battery cells (4a, 4b, 4c, . . . ) and forms part of an electric storage system (15), said method comprising a step of executing a ready-to-run function for optimizing the performance of said battery pack (4) during use. Furthermore, the method comprises the steps of: calculating a setpoint temperature ($T_s$) for the battery pack (4) to reach in order to provide a sufficient level of performance without further thermal conditioning during a predetermined time period (t); and thermally conditioning said battery pack (4) so as to reach said setpoint temperature ($T_s$). The invention also relates to an arrangement for such a thermal conditioning.

3 Claims, 3 Drawing Sheets

(51) Int. Cl.
*B60L 53/14* (2019.01)
*B60L 53/302* (2019.01)
*H01M 10/613* (2014.01)
*H01M 10/615* (2014.01)
*H01M 10/633* (2014.01)
*B60L 58/27* (2019.01)
*B60L 58/26* (2019.01)

(52) U.S. Cl.
CPC ............ *B60L 58/27* (2019.02); *H01M 10/613* (2015.04); *H01M 10/615* (2015.04); *H01M 10/633* (2015.04); *B60L 2240/545* (2013.01); *H01M 2220/20* (2013.01)

(58) Field of Classification Search
CPC .......... B60L 58/27; B60L 58/26; B60L 53/14; B60L 53/302; B60L 2240/545; B60L 58/22; Y02E 60/10; Y02T 90/12; Y02T 10/70; Y02T 10/7072; Y02T 90/14
See application file for complete search history.

(56) References Cited

U.S. PATENT DOCUMENTS

| | | | |
|---|---|---|---|
| 2014/0039735 A1 | 2/2014 | Major et al. | |
| 2014/0266038 A1 | 9/2014 | Gibeau et al. | |
| 2015/0306974 A1 | 10/2015 | Mardall et al. | |

* cited by examiner

METHOD AND SYSTEM FOR THERMAL CONDITIONING OF A BATTERY PACK

TECHNICAL FIELD

The invention relates to a method for thermal conditioning of a battery pack, wherein said battery pack comprises a plurality of battery cells and forms part of an electric storage system. The method comprises a step of executing a ready-to-run function for optimizing the performance of said battery pack during use.

The invention also relates to an arrangement for thermal conditioning of a battery pack, said arrangement comprising a battery pack comprising a plurality of battery cells and forming part of an electric storage system. The arrangement is configured for executing a ready-to-run function in order to optimize the performance of said battery pack during use.

The invention can be applied in heavy-duty vehicles, such as trucks, buses and construction equipment. Although the invention will be described with respect to a bus, the invention is not restricted to this particular vehicle, but may also be used in other vehicles.

BACKGROUND

In the field of vehicles, there is a steady development related to propulsion of vehicles with alternative power sources, i.e. power sources being used as alternatives to conventional internal combustion engines. In particular, electrically operated vehicles have emerged as a promising alternative.

According to today's technology, a vehicle can be operated by means of an electric machine solely or by means of an arrangement comprising both an electric machine and an internal combustion engine. The latter alternative is often referred to as a hybrid electric vehicle (HEV), and can for example be utilized in a manner in which an internal combustion engine is used for operating the vehicle while driving outside urban areas whereas the electric machine can be used in urban areas or in environments in which there is a need to limit the discharge of harmful pollutants such as for example carbon monoxide and oxides of nitrogen. Another type of vehicle is the so-called plug-in hybrid electric vehicles (PHEV) which is arranged so that an external power supply can be used for charging a battery pack used to power an electric machine in the vehicle. This charging process can be implemented with the use of grid electricity.

The technology involved in electrically operated vehicles is closely related to the development of electrical energy storage systems, including battery-related technology for vehicles. A vehicle which is operated by means of an electric machine is normally supplied with power from a rechargeable electrical energy storage system, i.e. a battery pack with rechargeable battery cells which can be charged by means of an external electric power supply, as mentioned above. This is carried out after the energy storage system and the external power supply have been electrically connected by means of suitable connector elements. The battery pack forms, together with control circuits, an energy storage system which is configured for providing electric power to the electric machine.

In the automotive field, an energy storage system normally comprises a battery pack with a large number of battery cells. A battery pack may for example be of the lithium-ion type. In the event that a 600 V lithium-ion battery pack is used, for example approximately 200 battery cells connected in series will then be needed to achieve a desired voltage in order to operate the vehicle. The available range for driving the vehicle depends on certain parameters such as the state of charge (SOC) of the battery pack. The state of charge is an important parameter to use in order to manage the available energy in electric vehicles.

It is known that the power output and performance of an energy storage system, comprising a battery pack of the above-mentioned type, depends on the temperature of the battery pack. A battery pack which is used in a plug-in electric hybrid vehicle, for example, must operate under demanding conditions involving both extremely low and high temperatures, for example in the interval between −20 and +40 degrees centigrade. This means that the performance of such a battery pack may vary considerably depending on the actual temperature during operation. For example, it can be expected that the range of such a vehicle will be significantly lower if the battery pack has a very low temperature.

In addition to the known fact that a energy storage system for an electric vehicle has a performance which depends on the temperature of the battery pack, there is obviously a general desire to provide a battery pack which is configured so as to offer optimum performance when needed.

Consequently, it is of high importance to optimize the properties of the battery pack at all times while considering the important fact that the battery has a temperature dependence. The performance can generally be increased by charging the battery pack and also by optimizing the temperature of the battery pack. On the other hand, if the battery pack is charged too much, this may be detrimental to the lifetime and functionality of the and battery pack and the electronic components which are associated with the energy storage system.

Thermal conditioning systems for electric vehicles are previously known. The patent document US 2015/306974 teaches a system which is configured for thermal conditioning of a battery pack during charging of said battery pack.

Although the US 2015/306974 document teaches a way of thermally conditioning a battery pack, there is a desire to provide improved energy storage systems which ensure that crucial functions of the energy storage system has a high level of performance when they are needed while at the same time ensuring an optimal lifetime and quality of the electronic components associated with the energy storage system.

SUMMARY

An object of the invention is to provide a method and an arrangement for thermal conditioning of a battery pack which provides a ready-to-run function which ensures optimum performance of the energy storage system, while at the same time limiting the amount of charging in order to obtain a long lifetime and optimized functionality for relevant electronic components.

The object is achieved by a method for thermal conditioning of a battery pack, wherein said battery pack comprises a plurality of battery cells and forms part of an electric storage system, said method comprising a step of executing a ready-to-run function for optimizing the performance of said battery pack during use. Furthermore, the method comprises the steps of: calculating a setpoint temperature for the battery pack to reach in order to provide a sufficient level of performance without further thermal conditioning during a predetermined time period; and thermally conditioning said battery pack so as to reach said setpoint temperature.

By the provision of a method as defined above, the battery pack will be thermally conditioned to provide full performance for a given time.

According to one embodiment, said method further comprises a step of executing said ready-to-run function when said battery pack is electrically connected to an external power supply which is configured for charging said battery pack. Preferably, the ready-to-run function is executed after charging of said battery pack has been initiated. This means that the ready-to-run function can be implemented at a suitable occasion at the same time as the battery pack is charged.

According to one embodiment, the energy storage system enters a sleep mode when the battery pack has reached said setpoint temperature, and the charging is terminated when the sleep mode is entered. In this manner, the battery pack will be thermally conditioned to provide full performance while ensuring that the energy storage system does not have to be constantly in an active state.

According to one embodiment, the method further comprises a step of thermal conditioning by heating or cooling of the battery pack so as to reach said setpoint temperature.

According to an embodiment, the method comprises choosing said setpoint temperature depending on at least an ambient temperature. This is a simple but effective way of controlling the thermal conditioning process.

Furthermore, according to an embodiment, the method comprises choosing said predetermined time period depending on a need for maintenance of said battery pack. For example, the need for balancing the battery cells, or the need for calibrating parameters such as the state of charge (SOC), the state of power (SOP), the state of health (SOH) and the state of energy (SOE) can then be taken into account. This means that such maintenance activities can be carried out in a correct manner during the thermal conditioning process.

According to a further aspect of the invention, the object is obtained by means of an arrangement for thermal conditioning of a battery pack, said arrangement comprising a battery pack comprising a plurality of battery cells and forming part of an electric storage system, said arrangement further being configured for executing a ready-to-run function in order to optimize the performance of said battery pack during use. The arrangement comprises a thermal conditioning unit which is associated with said battery pack, wherein said arrangement comprises a control unit which is configured for calculating a setpoint temperature for the battery pack to reach in order to provide a sufficient level of performance without further thermal conditioning during a predetermined time period, and also configured for controlling said thermal conditioning unit so that said battery pack reaches said setpoint temperature.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

DETAILED DESCRIPTION OF EXAMPLE EMBODIMENTS OF THE INVENTION

Different aspects of the present disclosure will be described more fully hereinafter with reference to the enclosed drawings. The method and system disclosed herein can, however, be realized in many different forms and should not be construed as being limited to the aspects set forth below.

The invention will now be described with reference to an embodiment and the enclosed drawings. With initial reference to FIG. 1, there is shown a simplified perspective view of a vehicle in the form of a bus 1 which according to the embodiment is of the electric type and is equipped with an electric machine 2 which can be used for operating the bus 1. This is shown schematically in FIG. 1 by means of a rear axle 3 which is connected to the electric machine 2.

Figure 1:
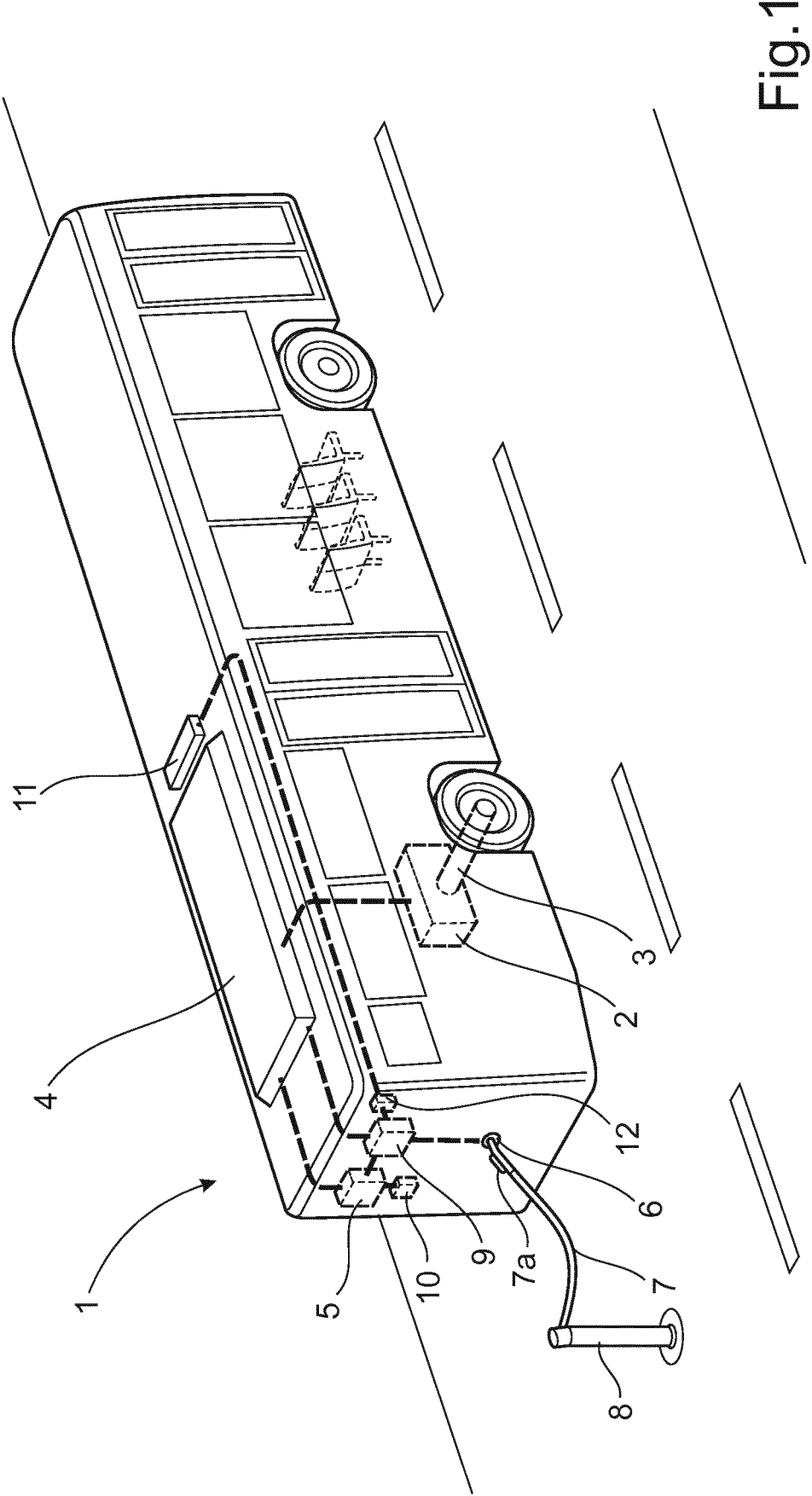
FIG. 1 shows a simplified perspective view of a vehicle in which the present invention can be implemented.

The bus 1 carries an electric energy storage system with a battery pack 4 which in turn comprises a plurality of battery cells (not shown in detail in FIG. 1). As will be described in greater detail below, the battery cells are connected in series to provide an output DC voltage. Suitably, the battery cells are of lithium-ion type, but other types may also be used.

The battery pack 4 is also connected to an electronic control unit 5 which is arranged for measuring one or more predetermined parameters which are indicative of the state of operation of the battery pack 4. For example, the control unit 5 can be configured for measuring the voltage of the battery pack 4 and its battery cells, or one or more alternative parameters such as the battery current or the temperature of each battery cell. The control unit 5 can also be configured for determining parameters indicating and controlling the condition or capacity of the battery pack 4, such as the state of charge (SOC), the state of health (SOE) and the state of energy (SOE) of the battery pack 4. The battery pack 4 will be described in greater detail below with reference to FIG. 2.

According to the embodiment, the battery pack 4 is arranged on the roof of the bus 1, as indicated in FIG. 1, but other arrangements of the battery pack 4 are also possible within the scope of the invention.

Other components of the propulsion system of the bus 1, which are not shown here in detail, are also connected to the control unit 5. Even though the invention is described with reference to a vehicle in the form of a bus, it can be used for virtually any type of vehicle which is operated by means of at least an electric machine and which has an energy storage system comprising a battery pack with a number of battery cells.

During operation of the bus 1, the battery pack 4 will deliver the required power to the electric machine 2, which in turn is driving the rear axle 3. The manner in which an electric machine can be used for operating a vehicle is generally previously known and for this reason, it is not described in detail here.

The bus 1 is equipped with a first electric connector element 6, suitably in the form of a socket which is mounted on an outside part of the bus 1. The first connector element 6 is arranged to be connected to a second electric connector element 7 in the form of a charging cable which is provided with a plug 7a which can be electrically connected to the first connector element 6 and which is configured for conducting a charging current having a certain voltage. The second electric connector element 7 forms part of an external power supply 8, which suitably is connected to an AC grid system. In this manner, the battery pack 4 can be supplied with an electrical current by means of the connector elements 6, 7. More precisely, the electric current is fed to an on-board charging unit 9 which is connected to the battery pack 4 for charging thereof.

According to an embodiment, charging of the battery pack 4 takes place while the bus 1 is standing still, i.e. either at a charging station at a bus terminal or at a bus stop or a similar position.

As shown in FIG. 1, the vehicle 1 is arranged to be operated by means of the electric machine 2 only. According to a further embodiment (which is not shown in the drawings), the vehicle may be a hybrid vehicle, for example a so-called plug-in hybrid vehicle which is equipped with both an internal combustion engine and an electric machine which are connected to each other via a clutch. Both the internal combustion engine and the electrical machine can then be used alternately or in parallel to operate the vehicle.

In the shown example, a process for charging the battery pack 4 can be initiated when the bus is standing still so that the connector elements 6, 7 can be connected with each other. This means that charging of the battery pack 4 can be initiated after connection of the battery pack 4 to the external power supply 8.

According to an alternative embodiment, which is not shown in the drawings, the charging of the battery pack can be implemented by means of a connector element in the form of a pantograph which is arranged on the roof of the vehicle 1 and which is connected to an external power supply via an overhead wire. According to a yet further embodiment, the charging can be implemented by means of a current conducting power rail which is arranged along the road surface. Such an arrangement is configured to cooperate with one or more current collectors of the vehicle which are movable and lowered towards the ground, and which may be configured to be connected with said current conducting power rail during operation of the vehicle.

As mentioned initially, it is known that the power output and performance of a battery pack depends on its temperature. For this reason, this disclosure relates to an arrangement and method for thermal conditioning of the battery pack 4. In order to implement such thermal conditioning, an ambient temperature sensor 10 is arranged in the vehicle 1 and is connected to the control unit 5. Furthermore, a thermal conditioning unit 11 is arranged in connection with the battery pack 4 and is configured for heating or cooling the battery pack 4 depending on thermal requirements related to the battery pack 4.

The thermal conditioning unit 11 is powered by means of the on-board charging unit 9, via a voltage converter 12. Furthermore, the control unit 5 is connected to the thermal conditioning unit 11 and is configured for controlling the thermal conditioning unit as will be described below.

The manner in which the thermal conditioning of the battery pack 4 is carried out will now be described in greater detail with reference to FIG. 2 which is a schematic figure showing the battery pack 4, the control unit 5, the on-board charging unit 9 and certain other associated components of the vehicle 1.

According to an embodiment, the battery pack 4 comprises a plurality of battery cells, symbolically represented by three battery cells 4a, 4b, 4c, which are connected in series and which provide an output battery voltage. The battery pack 4 contains a large number of battery cells, suitably in the magnitude of 200 cells, although the specific number may vary. According to the embodiment, the battery cells 4a, 4b, 4c are of the lithium-ion type, although the principles of the invention are equally applicable to other types of battery cells. Also, although the embodiment comprises one single battery pack, it should be noted that the invention is applicable in cases where several battery packs are combined in one single vehicle.

As mentioned above with reference to FIG. 1, the battery pack 4 is connected to an electric machine 2 and is configured for operating said electric machine 2, which in turn operates the vehicle in question. Furthermore, the battery pack 4 is connected to the on-board charging unit 9 so as to allow charging of the battery pack 4 when the charging unit 9 is connected to the external power supply 8. The external power supply 8 is typically configured for supplying a 400 V AC three-phase voltage. The charging unit 9 typically supplies a voltage of 700 V DC to the battery pack 4. However, alternative specifications are possible within the scope of the invention.

Furthermore, the battery pack 4 comprises a battery temperature sensor 13, which is connected to a battery control unit 14. The general purpose of the battery control unit 14 is to control the charging procedure of the battery pack 4 and also to monitor its condition. Suitably, the battery control 14 can also be configured to implement a battery cell balancing process. Such a cell balancing process can be required when the voltages of different battery cells in the battery pack 4 differ between cells during the course of time. If cell balancing is not carried out, this may result in degraded battery properties.

The battery control unit 14 is connected to the above-mentioned control unit 5. Furthermore, the ambient temperature sensor 10 is also connected to the control unit 5. The battery pack 4, the control unit 5, the ambient temperature sensor 10, the battery temperature sensor 13 and the battery control unit 14 together form an energy storage system 15.

Figure 2:
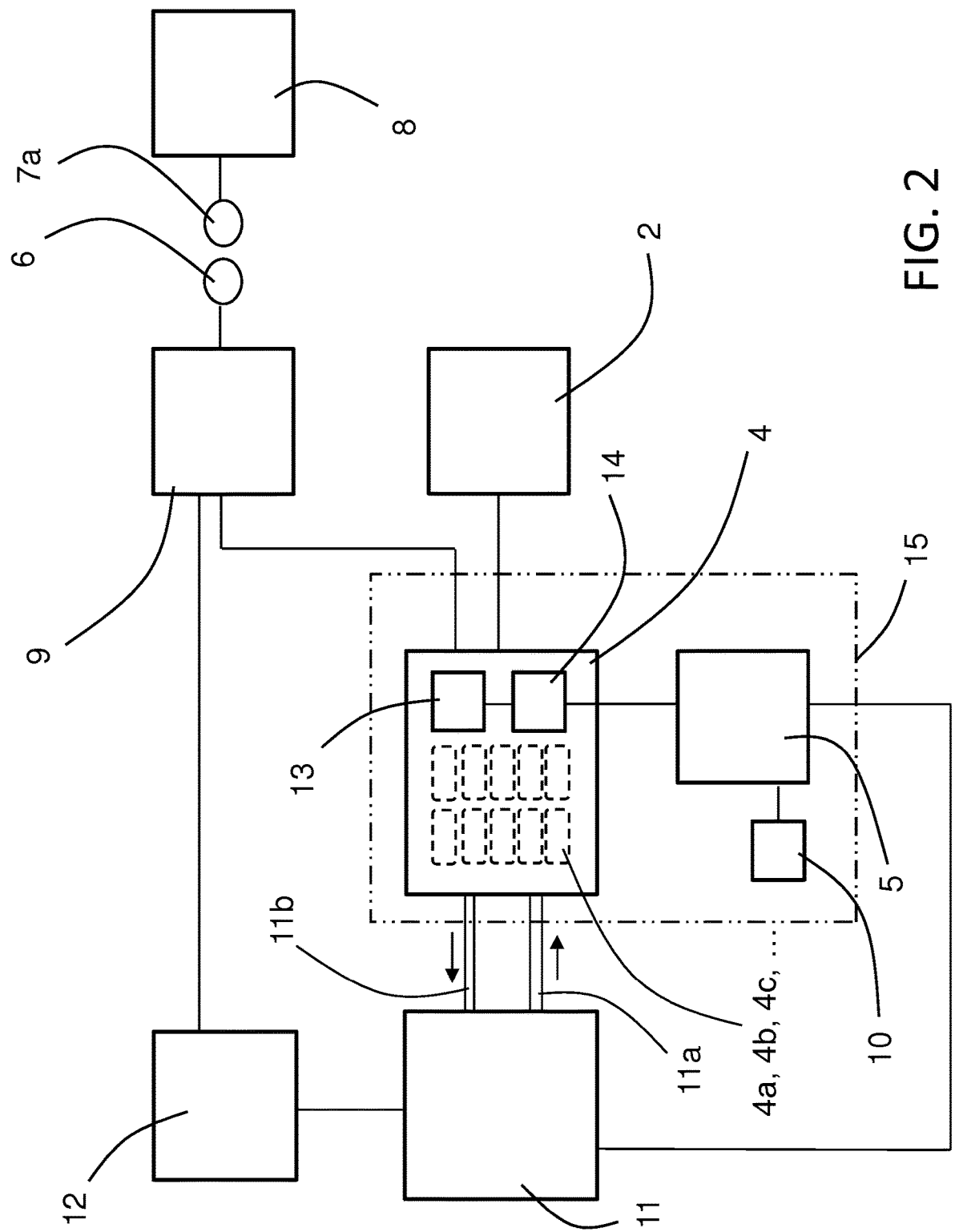
FIG. 2 is a schematic view of an arrangement for according to an embodiment of the invention.

Furthermore, the charging unit 9 is connected to the voltage converter 12, which is configured for supplying electric power to certain low voltage components in the vehicle, for example components such as air condition systems, heating devices and lighting units (not shown in FIG. 2). The voltage converter 12 is also connected to the thermal conditioning unit 11 which is configured for heating or cooling the battery pack 4 so that it may assume a particular battery temperature ($T_B$). As regards most vehicles, the battery pack 4 is configured so that it can operate at an ambient temperature which at least should be between −20 and +45 degrees centigrade.

More precisely, the thermal conditioning unit 11 is provided with an electrical heater (not shown in detail) which is configured for heating a liquid which flows in an input liquid circuit 11a towards the battery pack 4. The liquid is pumped through a circuit associated with the battery pack 4 and is returned to the thermal conditioning unit 11 through an output liquid circuit 11b. The thermal conditioning unit 11 is arranged close to the battery pack 4 in order to be used for thermal conditioning of said battery pack 4.

Consequently, the on-board charging unit 9 supplies electric energy both in the form of a traction voltage which is supplied to the battery pack 4 and also a low voltage, via the voltage converter 12, to certain electric components of the vehicle such as the thermal conditioning unit 11.

As mentioned initially, it is known that the power output and performance of the energy storage system 15, comprising the battery pack 4, depends on the temperature $T_B$ of the battery pack 4. In this regard, it should be noted that a measurement of the actual temperature $T_B$ of the battery pack 4 is provided by means of the battery temperature sensor 13. It is also known that the battery pack 4 needs to be charged regularly so as to provide optimum performance. Charging is provided by means of the external power supply 8 which can be connected to the on-board charging unit 9 at suitable occasions, as mentioned above.

With regard to a vehicle 1 in the form of a bus which is operated commercially, it can be expected that such a bus needs to be parked at a charging facility at night or at other suitable times when it is not operated in traffic. At such occasions, there is normally a requirement to charge the battery pack 4 to reach a predetermined state of charge (SOC) in order to ensure that the energy storage system 15 provides a sufficiently high level of performance the next time the vehicle will be used. This means that there a demand for a "ready-to-run" function which ensures a high level of performance of the energy storage system 15 when the vehicle is to be used the next time after charging.

It is important to take into account that the charging procedure should be carried out for as short time period as possible, in order to save energy and to increase the lifetime of all relevant vehicle components. Otherwise, i.e. if the energy storage system 15 is constantly "active", meaning that the battery pack 4 is charged constantly, there may by problems regarding durability and functionality of the battery pack 4 and its associated components, which is a disadvantage. Another problem with this approach is that it is not always known when the vehicle will be used again. For this reason, it may not always be possible to determine how long charging time is actually needed.

Consequently, there is a demand for a charging procedure which does not last for an unnecessarily long time, yet which is sufficient to bring the energy storage system 15 to an optimal ready-to-run condition. Parameters which can be used to define a sufficiently high level of performance are for example certain parameters used to determine the condition and state of the battery pack 4, for example the state of charge (SOC) and the state of power (SOP), and optionally also the state of health (SOH) and the state of energy (SOE).

For the above-mentioned reason, the present disclosure is based on the principle that a particular method for thermal conditioning of the battery pack 4 is carried out during charging. More precisely, the method comprises an initial step of initiating charging of the battery pack 4 by connecting it to the external power supply 8 (see FIGS. 1 and 2). Next, a ready-to-run function is executed during the charging, in order to optimize the performance of the battery pack 4 when it should be used.

The ready-to-run function is based on the principle that a particular setpoint temperature $T_S$ for the battery pack 4 is determined and used for the thermal conditioning process. The setpoint temperature $T_S$ is then used as a target temperature for the thermal conditioning unit 11, i.e. for heating or cooling the battery pack 4 in order to reach said setpoint temperature $T_S$. The value of the setpoint temperature $T_S$ is chosen to a magnitude which corresponds to a condition of the battery pack 4 in which it does not need any further thermal conditioning during a predetermined time period t (after charging has been terminated). In this manner, the battery pack 4 can be thermally conditioned in order to ensure full performance for said time period t.

Consequently, and with reference to the embodiment of FIGS. 1 and 2, when the external power supply 8 has been connected to the on-board charging unit 9 in order to charge the battery pack 4, the ready-to-run function is activated. The purpose of this ready-to-run function is to ensure that all relevant functions of the energy storage system have full performance when they are needed, while ensuring that the energy storage system 15 may be disconnected and enter an inactive condition, i.e. a "sleep" mode, when a sufficient amount of charging has been carried out. It should be noted that the invention is not limited to an embodiment in which the ready-to-run function is always initiated during actual charging of the battery pack 4. The main principle of the invention relates to the execution of the ready-to-run function in order to ensure full performance of the energy storage system.

The control unit 5 will determine the setpoint temperature $T_S$, based on requirements relating to a given time period during which it may ensure full performance. In other words, it will calculate the setpoint temperature $T_S$ as a temperature that it shall be conditioned to in order to not need any thermal conditioning for a given time t while delivering full performance without the need for any additional thermal conditioning.

The magnitude of the setpoint temperature $T_S$ may be determined based on several parameters. In particular, it depends on the ambient temperature $T_A$, as detected by means of the ambient temperature sensor 10. This means that the cooling down of the battery pack 4 as a function of the ambient temperature $T_A$ can be used to calculate the setpoint temperature $T_S$.

According to a further embodiment, the magnitude of the time period t depends on a requirement related to a need for certain time during which certain maintenance functions for the battery pack 4 can be carried out. An example of such a maintenance function is a cell balancing process which must be initiated due to unbalance of the battery cells 4a, 4b, 4c, as described above. A further example of a maintenance function is a calibration process for parameters indicating the condition of the battery pack 4, such as the state of charge (SOC) and the state of power (SOP).

After the control unit 5 has determined the setpoint temperature $T_S$, the thermal conditioning unit 11 is initiated so as to bring the battery pack 4 to said temperature $T_S$. This can be obtained either by heating or cooling the battery pack 4. More precisely, heating is carried out if the actual battery pack temperature $T_B$ is lower than the setpoint temperature $T_S$, whereas cooling is carried out if the actual battery pack temperature $T_B$ is higher than the setpoint temperature $T_S$.

When the battery pack temperature $T_B$ has reached the setpoint temperature $T_S$, charging of the battery pack 4 will be terminated and the energy storage system 2 will enter a rest mode, or sleep mode, in which virtually no power is used and virtually no electronic components are used in the energy storage system 15. This is beneficial for the energy consumption, longevity and functionality of the energy storage system 15 and its components. This also means that the energy storage system 15 is now kept thermally conditioned while it is not active.

The next time the vehicle should be used, the energy storage system 15 is in a condition in which it can be expected to deliver full performance for the given time period t as specified above. Depending on the ambient temperature, there may occur a situation in which the battery temperature $T_B$ has decreased a certain amount as time lapses. For this reason, and according to an embodiment, the above-mentioned thermal conditioning process can be once again initiated in order to reach the setpoint temperature $T_S$ if the battery temperature $T_B$ has decreased to a predetermined level.

Figure 3:
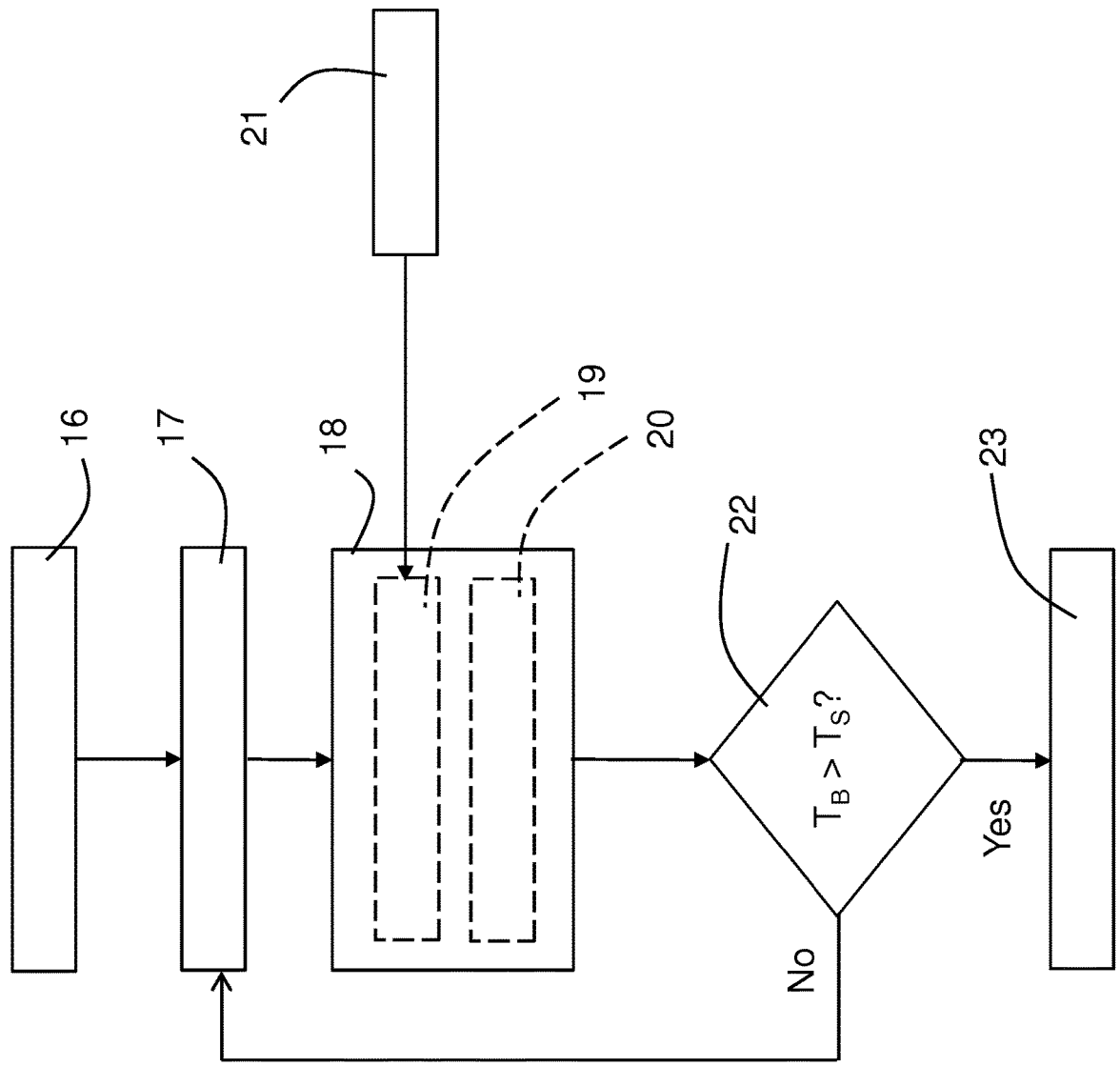
FIG. 3 is a flow chart showing the manner in which the invention is implemented.

The method according to this disclosure will now be described with reference to FIG. 3, which is a schematic flow chart illustrating the method. Initially, the on-board charging unit 9 is connected to the external power supply 8 (step 16 in FIG. 3) after which a process of charging the battery pack 4 is initiated (step 17). Next, a ready-to-run function is executed (step 18), firstly by calculating a setpoint temperature $T_S$ (step 19) for the battery pack 4 to reach in order to not need further thermal conditioning during a predetermined time period t, and secondly by thermally conditioning (step 20) the battery pack 1 so as to actually reach the setpoint temperature $T_S$. This is done either by cooling or heating the battery pack 4 by means of the thermal conditioning unit 11. As mentioned above, the setpoint temperature $T_S$ is suitably chosen based on the ambient temperature $T_A$ as detected by means of the ambient temperature sensor 10.

Regarding the value of the time period t, it can be selected (step 21) depending on one or both of the following parameters:
- a time needed for carrying out maintenance of the battery pack 4, such as balancing the battery cells 4a, 4b, 4c . . . ; and
- a time needed for calibrating parameters indicating the condition of the battery pack 4, for example the state of charge (SOC), the state of power (SOP), the state of health (SOH) and the state of energy (SOE) of the battery pack 4.

When it is determined that the battery pack temperature $T_B$ has reached the setpoint temperature $T_S$ (step 22), the energy storage system enters a sleep mode, i.e. an inactive mode, and the charging is terminated (step 23). If the battery pack temperature $T_B$ has not reached the setpoint temperature $T_S$, the charging continues. In this manner, a ready-to-run function is obtained, by means of which it will be ensured that the energy storage system 2 has full performance when this is needed while it is secured that the energy storage system 2 does not have to be in a constant active state.

It is to be understood that the present invention is not limited to the embodiments described above and illustrated in the drawings; rather, the skilled person will recognize that many changes and modifications may be made within the scope of the appended claims.

For example, the invention can be applied in vehicles such as trucks, buses and construction equipment. However, the invention is not restricted to vehicles but may generally be used in other applications, such as storage batteries being used for example for back-up purposes for serving electric devices in domestic or commercial environments.

The invention claimed is:

1. A method for thermal conditioning by heating or cooling of a battery pack, wherein said battery pack comprises a plurality of battery cells and forms part of an electric storage system, said method comprising:
   executing a ready-to-run function for optimizing the performance of said battery pack during use, said ready-to-run function being executed when said battery pack is electrically connected to an external power supply which is configured for charging said battery pack;
   said method being characterized by executing the ready-to-run function comprising the steps of: calculating a setpoint temperature ($T_S$) for the battery pack to reach in order to provide a sufficient level of performance without further thermal conditioning during a predetermined time period (t) after said charging is terminated;
   wherein said setpoint temperature ($T_S$) is selected depending on at least an ambient temperature ($T_A$) and said predetermined time period (t) is selected depending on any one of a time needed for carrying out maintenance of the battery pack and a time needed for calibrating a parameter indicating the condition of the battery pack;
   thermally conditioning said battery pack by heating or cooling of the battery pack so as to reach said setpoint temperature ($T_S$);
   entering a sleep mode when the battery pack has reached said setpoint temperature ($T_S$); and
   terminating said charging when said sleep mode is entered.

2. The method according to claim 1, wherein said method further comprises: executing said ready-to-run function after initiating charging of said battery pack.

3. The method according to claim 1, wherein said method further comprises: thermal conditioning of a battery pack in a vehicle, said energy storage system being configured for operating an electric machine in said vehicle.

* * * * *